(No Model.) 2 Sheets—Sheet 1.

C. W. BOND.
BAND CUTTER AND FEEDER.

No. 445,668. Patented Feb. 3, 1891.

Witnesses
A. Ruppert.
H. A. Daniels.

Inventor
Charles W. Bond
Per
Thomas P. Simpson
Attorney

THE NORRIS PETERS CO., PHOTO-LITHO., WASHINGTON, D. C.

(No Model.) 2 Sheets—Sheet 2.

C. W. BOND.
BAND CUTTER AND FEEDER.

No. 445,668. Patented Feb. 3, 1891.

Witnesses
A. Ruppert
H. A. Daniels

Inventor
Charles W. Bond
Per
Thomas P. Simpson
Attorney

UNITED STATES PATENT OFFICE.

CHARLES W. BOND, OF RIPYVILLE, KENTUCKY.

BAND-CUTTER AND FEEDER.

SPECIFICATION forming part of Letters Patent No. 445,668, dated February 3, 1891.

Application filed February 25, 1890. Serial No. 341,766. (No model.)

*To all whom it may concern:*

Be it known that I, CHARLES W. BOND, a citizen of the United States, residing at Ripyville, in the county of Anderson and State of Kentucky, have invented certain new and useful Improvements in Band-Cutters and Feeders; and I do hereby declare the following to be a full, clear, and exact description of the invention, such as will enable others skilled in the art to which it appertains to make and use the same.

This invention relates to feeding and band-cutting attachments for thrashing-machines; and it consists in certain improvements in the construction of the same, as hereinafter described and claimed.

Figure 1:
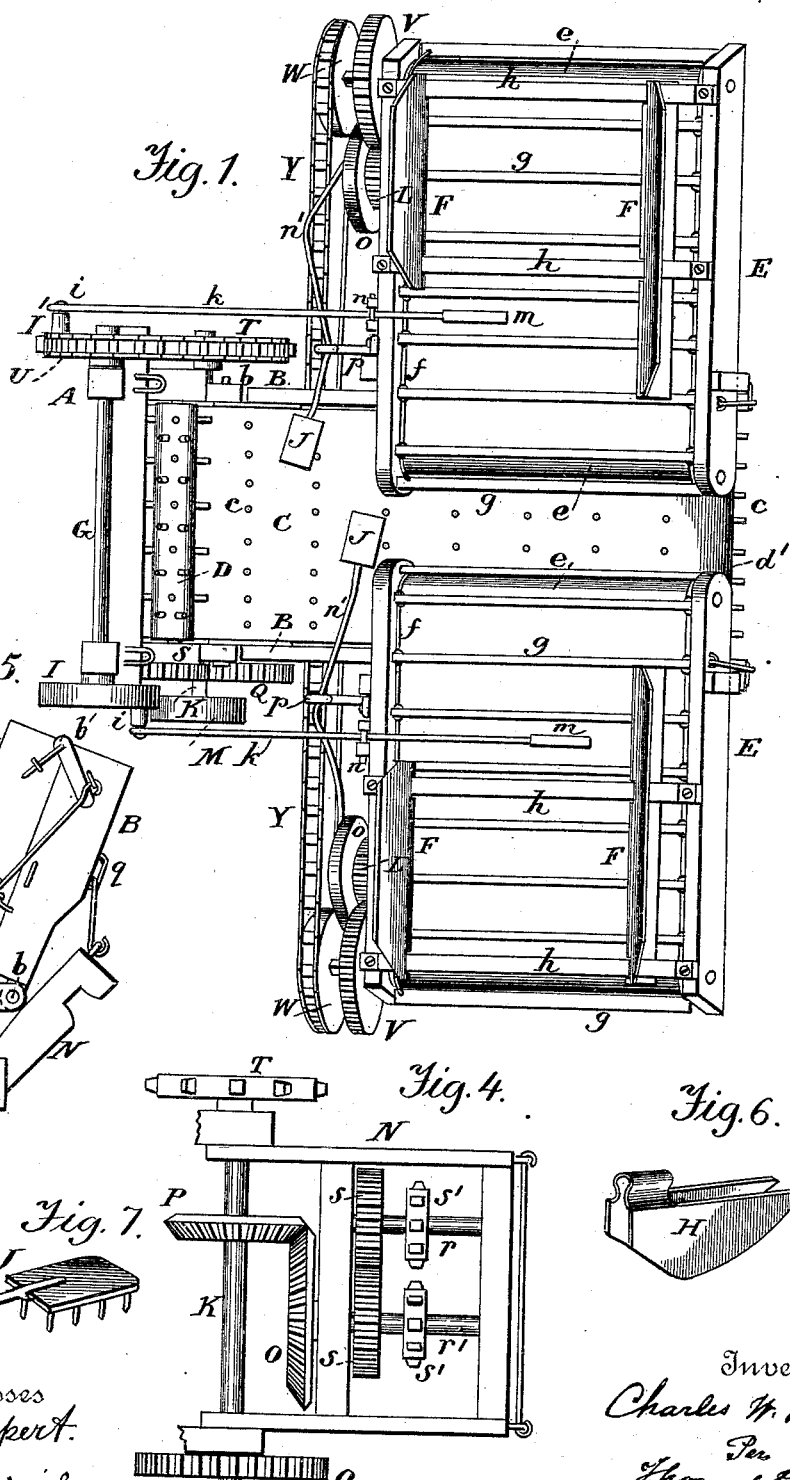
Figure 2:
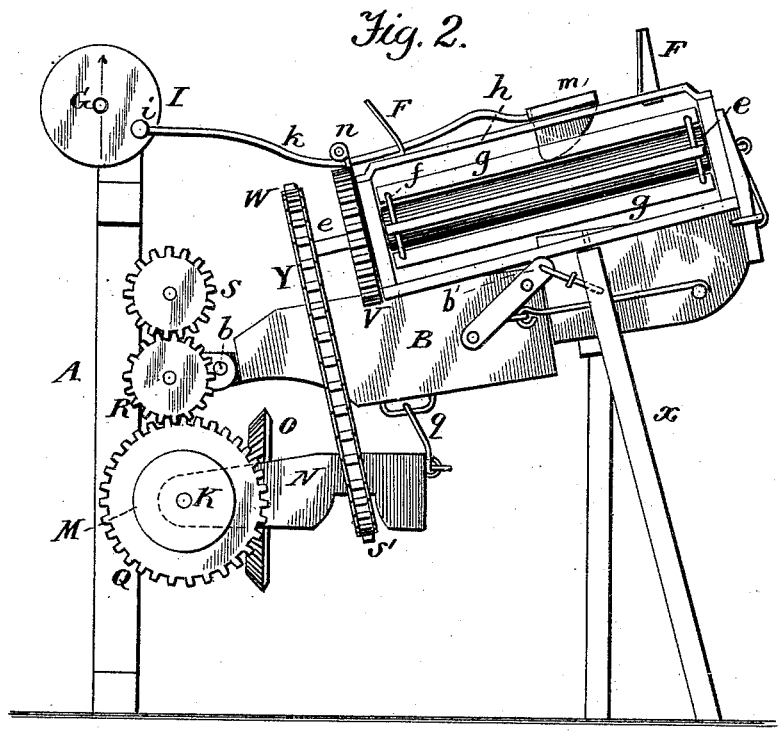
Figure 3:
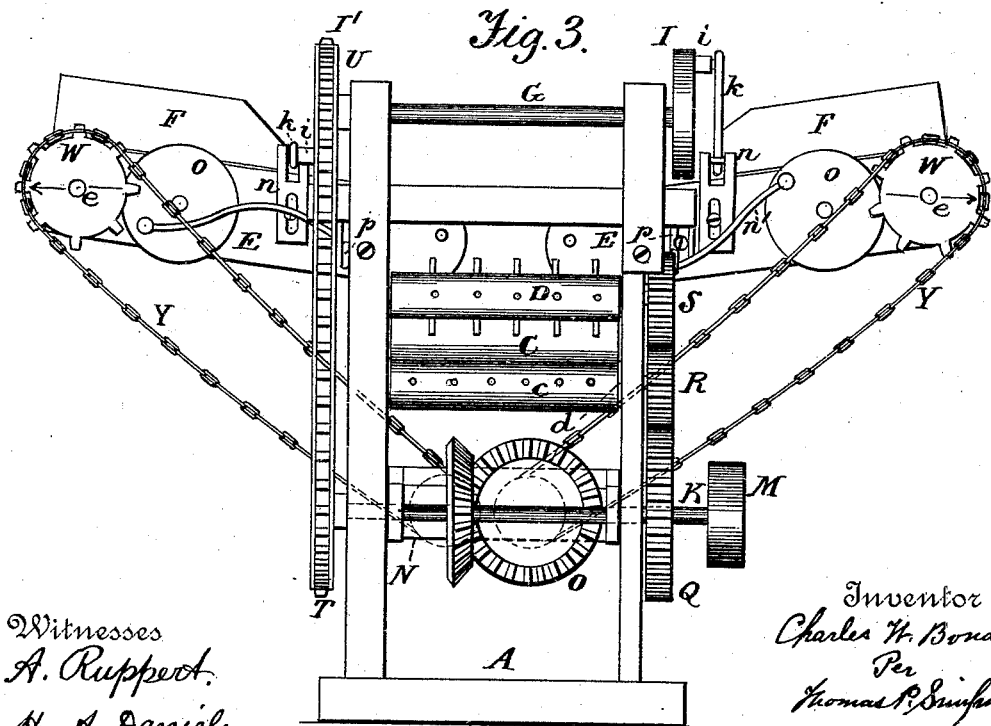

In the accompanying drawings, Figure 1 represents a plan view of a feeder and band-cutter provided with my improvements. Fig. 2 is a side view of the same. Fig. 3 is an end view showing the end which is to be connected with the thrasher. Fig. 4 is a plan view of a frame in which a part of the mechanism is mounted. Fig. 5 illustrates the folding of parts for transportation. Fig. 6 represents a double-bladed cutter. Fig. 7 represents a rake-head detached.

A designates a vertical frame, which is secured to the thrasher when the feeder is placed for operation.

A frame B extends outward from the frame A and contains a carrier formed of an endless apron C, which is provided with teeth $c$ and conveys the grain to the cylinder of the thrasher. The apron C moves on a roller $d$, which is journaled in the frame A, and a roller $d'$, journaled in the outer end of frame B. The said frame B is pivotally connected at $b$ with the frame A, and is made in parts, which are hinged together at $b'$, so that the frame may be folded, as hereinafter stated.

A toothed roller D, which is journaled in the frame A, assists in taking the grain into the cylinder of the thrasher.

Two grain-tables are removably connected with the carrier-frame B, one being on each side of said frame and extending in opposite directions therefrom, as shown. Each of said grain-tables E has two rollers $e$ journaled in its frame, and an endless carrier, formed of chains or cords $f$ and cross-bars $g$, moves on said rollers to deliver the grain to the main carrier C. The cross-bars $g$ are spaced at proper distances apart for a bundle of grain to be placed between two of said bars on the table and the two opposite carriers move toward the center of the carrier C.

F indicates supplementary side pieces, which are provided for the tables E and are made adjustable toward or from each other on the fixed bars $h$, according to the length of the grain, so that the bundles will be carried under the band-cutters in the right position for cutting the bands.

In the top of the vertical frame A is journaled a rotative shaft G, on the extended ends of which are mounted the crank-wheels I and I', the wheel I' being also a chain-wheel in the mechanism.

The rods $k$ are provided with cutters $m$ and are connected with the wrist-pins $i$ of said crank-wheels, by which the cutters are actuated. The said rods extend through the vertical guides $n$, fixed to the grain-tables, the said guides being vertically-adjustable for regulating the movements of the cutters. Each of the rods $k$ is bent or formed with a downward curve in its central portion, and the guide $n$, through which the rod extends, may be so adjusted as to direct the movement of the cutter across the center of the carrier, and after the band is cut the cutter will be raised somewhat just before its return movement. As the crank-wheels I and I' impart to the cutters $m$ a partly vertical movement, such movement is modified by the curve in each of the rods $k$, and may be regulated by means of the adjustable guides $n$, so that each cutter is driven to the center of the carrier, and after cutting the band is raised somewhat before being drawn back by the movement of the crank-wheel.

H indicates a double-bladed knife to be used when the bundles are small, and two bundles may be placed between two bars $g$, as is sometimes done. The mechanism is so adjusted that in operation each cutter makes one stroke in each space between two bars of a carrier as the latter passes along, and the cutters make alternate strokes.

J indicates two rake-heads, attached to rods $n'$, which are connected with the crank-wheels $o$, which are secured to gear-wheels L, the latter being mounted on short shafts projecting from the tables E. The rods $n'$ extend through the adjustable guides $p$ and are bent so as to direct the movement of the rakes directly across the carrier C, the two rakes moving from opposite sides and serving to spread the grain as it is carried to the thrasher. The rods $n'$ of the rakes J are each formed with a downward curve to modify the movement imparted from the crank-wheel, and as the carrier C moves in a direction at right angles to the movement of the rake across the carrier a slightly lateral movement is imparted to the rake by the guide $p$, and a lateral curve or bend, which is made in the rod $n'$, so that the rake in its forward movement is kept in a line directly across the moving carrier. The rods of the cutters $m$ may also be formed with a slight lateral bend for a similar purpose.

K indicates the driving-shaft, on one end of which is a band-wheel M for connection with the driving-power.

N indicates a frame, which is pivotally connected at one end with shaft K, the opposite end being connected with frame B by the hooked rods and staples $q$. Two shafts $r$ and $r'$ are journaled in the frame N, on which shafts are the connecting gear-wheels $s$ and the chain-wheels $s'$. On shaft $r'$ is also mounted a bevel gear-wheel O, which is engaged by a bevel gear-wheel P on shaft K.

Motion is imparted from the driving-shaft K through connecting-gearing Q, R, and S to the toothed roller D and the main carrier C.

A chain-wheel T on the shaft K is connected by chain band U with the chain-wheel I' on the shaft G, motion being thus imparted to the wheels I I', with which the cutters are connected.

On the extended journal of a roller $e$ in each table E are secured a gear-wheel V and a chain-wheel W. The wheel V engages a gear L, to which is secured a crank-wheel $o$, the rakes being connected with wheels $o$. The chain-wheels W are connected by endless bands Y with the chain-wheels $s'$ on the shafts $r$ $r'$, which are carried by the frame N, so that motion is imparted from the driving-shaft K through shafts $r$ $r'$ and connecting mechanism to the crank-wheels $o$.

The attachment is constructed to be portable, the grain-tables being detachable and the frame B being constructed to be folded. The side pieces F may be constructed to be closed on the tables and the parts may be placed together for transportation, as seen in Fig. 5.

The machine is provided with removable supporting-legs $x$, which are adapted to be stuck in the ground, and the frame A being secured to the thrasher the parts are firmly held in position.

I claim—

1. The combination, with the frame of a band-cutter provided with an adjustable guide, of a carrier for bundles of grain, a shaft and crank-wheel thereon, and a cutter provided with a rod connected with said crank-wheel and extended through said guide, the said rod being provided with a downward curve for giving, in connection with said guide, direction to the movement of the cutter, substantially as and for the purposes described.

2. The combination, with the frame of a feeder provided with an adjustable guide, and a carrier mounted in said frame, of a shaft and crank-wheel thereon, and a rake provided with a rod connected with said crank-wheel and extended through the said guide, said rod being formed with a downward curve or bend and also a lateral bend, for giving, in connection with said guide, direction to the movement of said rake, substantially as set forth and described.

In testimony whereof I have affixed my signature in presence of two witnesses.

CHARLES W. BOND.

Witnesses:
B. D. HAWKINS,
T. H. BOND.